United States Patent
Park

(10) Patent No.: US 10,067,733 B2
(45) Date of Patent: Sep. 4, 2018

(54) ELECTRONIC DEVICE AND METHOD OF PLAYING MUSIC IN ELECTRONIC DEVICE

(71) Applicant: Samsung Electronics Co., Ltd., Suwon-si, Gyeonggi-do (KR)

(72) Inventor: Jin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 85 days.

(21) Appl. No.: 14/713,192

(22) Filed: May 15, 2015

(65) Prior Publication Data

US 2015/0331659 A1 Nov. 19, 2015

(30) Foreign Application Priority Data

May 16, 2014 (KR) .................. 10-2014-0059264

(51) Int. Cl.
| | |
|---|---|
| G06F 17/00 | (2006.01) |
| G06F 3/16 | (2006.01) |
| G10H 1/00 | (2006.01) |
| G06F 3/0346 | (2013.01) |

(52) U.S. Cl.
CPC ............ *G06F 3/165* (2013.01); *G06F 3/0346* (2013.01); *G10H 1/0008* (2013.01); *G10H 1/0083* (2013.01); *G10H 2220/201* (2013.01); *G10H 2220/211* (2013.01); *G10H 2220/241* (2013.01); *G10H 2220/351* (2013.01); *G10H 2220/371* (2013.01); *G10H 2220/391* (2013.01); *G10H 2220/395* (2013.01)

(58) Field of Classification Search
CPC ...... A63F 13/00; A63F 13/814; A63F 13/211; A63F 13/212; A63F 2300/8047; G10H 2220/321; G10H 2220/391; G10H 2220/395; G10H 2220/201; G10H 2220/241; G10H 1/342; G10H 2230/135; G06F 3/014; G06F 3/017; G06F 3/165

See application file for complete search history.

(56) References Cited

U.S. PATENT DOCUMENTS

| | | | |
|---|---|---|---|
| 6,542,584 B1 | 4/2003 | Sherwood et al. | |
| 8,835,738 B2 * | 9/2014 | Little ................. | G10H 1/38 84/613 |

(Continued)

FOREIGN PATENT DOCUMENTS

| | | |
|---|---|---|
| KR | 10-2008-0047038 A | 5/2008 |
| KR | 10-2013-0108891 A | 10/2013 |
| WO | 2008000039 A1 | 1/2008 |

OTHER PUBLICATIONS

XP 054977171, "Sony Ericsson MBW 150 Bluetooth Watch demo" Sep. 26, 2013.

*Primary Examiner* — Andrew C Flanders
(74) *Attorney, Agent, or Firm* — Jefferson IP Law, LLP

(57) ABSTRACT

An electronic device executing a music playing application is provided. The electronic device includes a communication module configured to receive control information from a second electronic device connected through a wireless communication when the music playing application is executed, a processor configured to process the received control information to be applied to music data requested to be reproduced according to the execution of the music playing application, and an audio module configured to output the music data processed by the processor.

23 Claims, 12 Drawing Sheets

(56) References Cited

U.S. PATENT DOCUMENTS

| | | | |
|---|---|---|---|
| 2001/0015123 A1* | 8/2001 | Nishitani | A63B 71/0686 |
| | | | 84/615 |
| 2002/0126014 A1 | 9/2002 | Nishitani et al. | |
| 2005/0098021 A1 | 5/2005 | Hofmeister et al. | |
| 2006/0060068 A1* | 3/2006 | Hwang | G10H 1/0008 |
| | | | 84/615 |
| 2009/0256801 A1* | 10/2009 | Helmer | G10H 1/342 |
| | | | 345/156 |
| 2010/0009750 A1* | 1/2010 | Egozy | A63F 13/005 |
| | | | 463/35 |
| 2010/0287471 A1* | 11/2010 | Nam | G06F 3/011 |
| | | | 715/702 |
| 2011/0021273 A1* | 1/2011 | Buckley | A63F 13/00 |
| | | | 463/31 |
| 2011/0316793 A1 | 12/2011 | Fushiki | |
| 2013/0135223 A1* | 5/2013 | Shai | G06F 3/014 |
| | | | 345/173 |
| 2014/0045547 A1* | 2/2014 | Singamsetty | G06F 1/1643 |
| | | | 455/552.1 |
| 2015/0143976 A1* | 5/2015 | Katto | A63F 13/211 |
| | | | 84/602 |

* cited by examiner

ELECTRONIC DEVICE AND METHOD OF PLAYING MUSIC IN ELECTRONIC DEVICE

CROSS-REFERENCE TO RELATED APPLICATION(S)

This application claims the benefit under 35 U.S.C. § 119(a) of a Korean patent application filed on May 16, 2014 in the Korean Intellectual Property Office and assigned Ser. No. 10-2014-0059264, the entire disclosure of which is hereby incorporated by reference.

TECHNICAL FIELD

The present disclosure relates to an electronic device and a method of playing music in an electronic device.

BACKGROUND

Various recent electronic devices have been developed to use various functions such as a photography function, a music function, a video function, a multimedia function, a game function, and the like as well as a wireless communication function. A display unit is provided on a front surface of the electronic devices for effective usage of the various functions. For example, a display unit (for example, a touch screen) that responds to a touch is provided on a front surface of recent smart phones.

In addition, various types of applications (for example, referred to as "Apps") may be installed and executed in electronic devices. Various input means (for example, a touch screen, buttons, a mouse, a keyboard, a sensor or the like) may be used to execute and control the applications in the electronic device.

Among the various applications, there is an application that can play music through a touch screen included in the electronic device so that a user feels as if a real musical instrument is played. Further, as another technology, there is a method of displaying performance information on a Television (TV) by using a medium device that can exchange an electrical signal with an actual electronic musical instrument.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method that may provide an instrument playing effect using a touch input sensor has been provided as a music playing method using an electronic device (for example, a smart phone).

For example, when a guitar playing application is executed, as a guitar string displayed on a touch screen is touched, a sound generated by stroking the corresponding guitar string is output.

However, the guitar playing application according to the related art reproduces only sounds similar to real guitar sounds, but has many differences with the experience of playing an actual instrument. Accordingly, the differences are obstacles to activate music playing through the electronic device (for example, the smart phone).

Therefore, it is desired to provide a user experience for music playing with an activity such as an action that a player holds a guitar and moves in rhythm like actual guitar playing.

Another aspect of the present disclosure is to provide an electronic device and a music playing method by an electronic device, which may provide a guitar playing effect by detecting a motion of an electronic device (for example, a wearable device).

Another aspect of the present disclosure is to provide an electronic device and a music playing method by an electronic device, which may connect two electronic devices through communication and provide a guitar playing effect by detecting a motion of at least one of the electronic devices, so as to provide a user experience similar to actual guitar playing.

In accordance with an aspect of the present disclosure, an electronic device executing a music playing application is provided. The electronic device includes a communication module configured to receive control information from a second electronic device connected through a wireless communication when the music playing application is executed, a processor configured to process the received control information to be applied to music data requested to be reproduced according to the execution of the music playing application, and an audio module configured to output the music data processed by the processor.

In accordance with another aspect of the present disclosure, a method of playing music in an electronic device is provided. The method includes receiving control information from a second electronic device connected through a wireless communication when a music playing application is executed, processing the received control information to be applied to music data requested to be reproduced according to the execution of the music playing application, and outputting the processed music data.

According to various embodiments of the present disclosure, it is possible to provide a user experience with no regard to time and place, which is more realistic and similar to playing an actual instrument in digital music playing using an electronic device such as a smart phone.

Further, according to various embodiments of the present disclosure, a user can acquire a user experience and activity similar to playing an actual instrument by determining a motion of playing an instrument through a wearable device linked with a smart phone.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
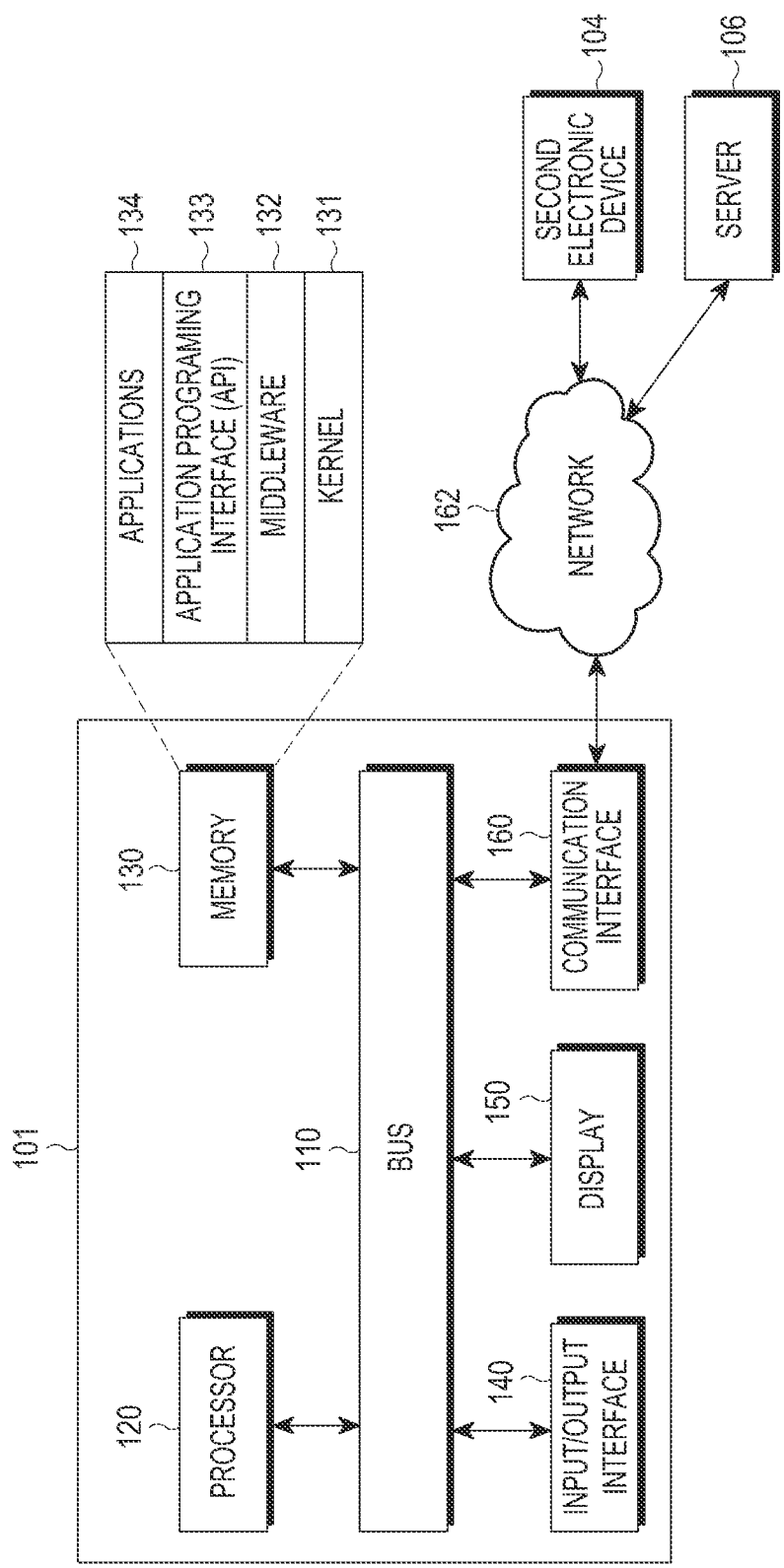
FIG. 1 illustrates a network environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the expression "include" or "may include" refers to existence of a corresponding function, operation, or element, and does not limit one or more additional functions, operations, or elements. The terms such as "include" and/or "have" may be construed to denote a certain characteristic, number, step, operation, constituent element, component or a combination thereof, but may not be construed to exclude the existence of or a possibility of addition of one or more other characteristics, numbers, operations, constituent elements, components or combinations thereof.

In the present disclosure, the expression "or" includes any or all combinations of words enumerated together. For example, the expression "A or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, without departing from the scope of the present disclosure, a first structural element may be named a second structural element. Similarly, the second structural element also may be named the first structural element.

When an element is referred to as being "coupled" or "connected" to any other element, it should be understood that not only the element may be directly coupled or connected to the other element, but also a third element may be interposed therebetween. Contrarily, when an element is referred to as being "directly coupled" or "directly connected" to any other element, it should be understood that no element is interposed therebetween.

In the present disclosure, the terms are used to describe specific embodiments, and are not intended to limit the present disclosure.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meaning equal to the contextual meaning in the relevant field of art, and are not to be interpreted to have ideal or excessively formal meaning unless clearly defined in the present disclosure.

An electronic device (for example, first electronic device or second electronic device in the embodiments described below) may be a device having a communication function. However, the present disclosure is not limited thereto. For example, the electronic device may include at least one of a smartphone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), a digital audio player, a mobile medical appliance, a camera, and a wearable device (e.g., a Head-Mounted-Device (HMD) such as electronic glasses, electronic clothes, an electronic bracelet, an electronic necklace, an electronic appcessory, electronic tattoos, or a smartwatch).

According to some embodiments of the present disclosure, the electronic device may be a smart home appliance with a communication function. The smart home appliance as an example of the electronic device may include at least one of, for example, a television (TV), a Digital Versatile Disc (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic picture frame.

According to some embodiments of the present disclosure, the entity may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), an in-vehicle infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a store.

According to some embodiments of the present disclosure, the electronic device may include at least one of a part of furniture or a building/structure having a communication function, an electronic board, an electronic signature receiving device, a projector, and various kinds of measuring instruments (e.g., a water meter, an electric meter, a gas meter, a radio wave meter, and the like). The electronic device according to the present disclosure may be a combination of one or more of the aforementioned various devices. Also, the electronic device according to the present disclosure may be a flexible device. Further, it is obvious to those skilled in the art that the electronic device according to the present disclosure is not limited to the aforementioned devices.

Hereinafter, an electronic device according to the various embodiments will be described with reference to the accompanying drawings. The term "user" used in the various embodiments may refer to a person or a device using the electronic device.

FIG. 1 illustrates a network environment including an electronic device according to various embodiments of the present disclosure.

Referring to FIG. 1, a first electronic device 101 may include at least one of a bus 110, a processor 120, a memory 130, an input/output interface 140, a display 150, and a communication interface 160.

The bus 110 may be a circuit for connecting the above-described components with each other and transferring communication (for example, control messages) among the above-described components.

The processor 120 may receive an instruction from the above-described other component elements (for example, the memory 130, the input/output interface 140, the display 150, the communication interface 160, or the like), for example, through the bus 110, decode the received instruction, and perform a calculation or data processing according to the decoded instruction.

The memory 130 may store the instruction or the data received from or generated by the processor 120 or other components (for example, the input/output interface 140, the display 150, the communication interface 160, or the like). The memory 130 may include programming modules, for example, a kernel 131, middleware 132, an Application Programming Interface (API) 133, applications 134, or the like. The aforementioned programming modules may be formed of software, firmware, hardware, or a combination of at least two thereof.

The kernel 131 may control or manage system resources (for example, the bus 110, the processor 120, the memory 130, or the like) which are used for executing operations or functions implemented by other programming modules, for example, the middleware 132, the API 133 or the applications 134. Furthermore, the kernel 131 may provide an interface through which the middleware 132, the API 133, or the applications 134 may access individual components of the first electronic device 101 to control or manage them.

The middleware 132 may perform a relay function to allow the API 133 or the applications 134 to communicate with the kernel 131 to exchange data. Further, in relation to requests for operations received from the applications 134, the middleware 132 may control (for example, a scheduling or a load-balancing) the requests by using, for example, a method of assigning a priority for first using system resources (for example, the bus 110, the processor 120, the memory 130, or the like) of the first electronic device 101 to at least one of the applications 134.

The API 133 is an interface by which the applications 134 control functions provided from the kernel 131 or the middleware 132, and may include, for example, at least one interface or function (for example, instructions) for a file control, a window control, an image processing, a text control, or the like.

According to various embodiments of the present disclosure, the applications 134 may include a Short Message Service (SMS)/Multimedia Messaging Service (MMS) application, an email application, a calendar application, an alarm application, a health care application (for example, application for measuring a quantity of exercise or blood sugar) or an application (for example, application providing information associated with pressure, humidity or temperature). Additionally or alternatively, the applications 134 may be an application related to the exchange of information between the first electronic device 101 and external electronic devices (for example, a second electronic device 104). The application related to the exchange of information may include, for example, a notification relay application for transferring predetermined information to the external electronic device or a device management application for managing the external electronic device.

For example, the notification relay application may include a function of transmitting notification information generated by another application (for example, the SMS/MMS application, the email application, the health care application or the environment information application) of the first electronic device 101 to the external electronic device (for example, the second electronic device 104). Additionally or alternatively, the notification relay application may receive notification information from, for example, an external electronic device (for example, the second electronic device 104), and provide the same to a user. The device management application, for example, may manage (for example, install, delete, or update) at least some functions (for example, turning external electronic device (or some elements) on or off or adjusting the brightness (or resolution) of a display) of an external electronic device (for example, the second electronic device 104) that communicates with the first electronic device 101, applications performed in the external electronic device, or services (for example, a phone call service, or a messaging service) provided from the external electronic device.

According to various embodiments of the present disclosure, the applications 134 may include an application designated according to a property (for example, a kind of the electronic device) of the external electronic device (for example, the second electronic device 104). For example, when the external electronic device is a digital audio player, the applications 134 may include an application related to the reproduction of music. Similarly, when the external electronic device is a mobile medical device, the applications 134 may include an application related to the health care. According to an embodiment, the applications 134 may include at least one of an application designated to the first electronic device 101 and an application received from an external electronic device (for example, a server 106 or the second electronic device 104).

Further, according to various embodiments of the present disclosure, the applications 134 may include an application related to musical performance. For example, when an application of the applications 134 is an application related to guitar playing, information related to the guitar playing may be displayed on the display 150 according to an execution of the application related to guitar playing by the processor 120. Further, according to the execution of the application 134, the first electronic device 101 may receive control information from the second external electronic device 104 (for example, a wearable device) through a network 162 and reflect the control information in the application related to the guitar playing, so as to provide a realistic guitar playing effect. Detailed embodiments thereof will be described below.

The input/output interface 140 may transfer an instruction or data input from a user through an input/output device (for example, a sensor, a keyboard, or a touch screen) to the processor 120, the memory 130, or the communication interface 160, through, for example, the bus 110. For example, the input/output interface 140 may provide the processor 120 data on a user's touch input through the touch screen. In addition, through an input/output device (for example, a speaker or the display), the input/output interface 140 may output the instruction or data received from the processor 120, the memory 130 or the communication interface 160 through, for example, the bus 110. For example, the input/output interface 140 may output voice data processed by the processor 120 to the user through the speaker.

The display 150 may display various pieces of information (for example, multimedia data, text data, and information related to a guitar playing application) for the user.

The communication interface 160 may connect communication between the first electronic device 101 and the external device (for example, the second electronic device 104 or the server 160). For example, the communication interface 160 may communicate with the external electronic device while being connected to the network 162 over wires or wirelessly. The wireless communication may include at least one of, for example, Wi-Fi, Bluetooth (BT), Near Field Communication (NFC), GPS and cellular communication (for example, Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM) or the like). The wired communication may include at least one of, for example, Universal Serial Bus (USB), High Definition Multimedia Interface (HDMI), Recommended Standard 232 (RS-232), and Plain Old Telephone Service (POTS).

According to an embodiment of the present disclosure, the network 162 may be a communication network. The communication network may include at least one of a computer network, the Internet, the Internet of things, and a telephone network. According to an embodiment of the present disclosure, a protocol (for example, a transport layer protocol, a data link layer protocol, or a physical layer protocol) for the communication between the first electronic device 101 and the external device may be supported by at least one of the applications 134, the API 133, the middleware 132, the kernel 131, and the communication interface 160.

Although FIG. 1 illustrates that the first electronic device 101 includes the communication interface 160 to communicate with the second electronic device 104, the server 106, or the like through the network 162, the first electronic device 101 may be implemented to independently operate without an additional communication function according to an embodiment of the present disclosure.

Figure 2:
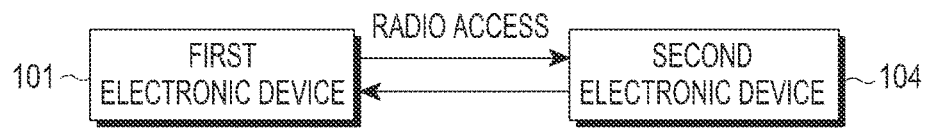
FIG. 2 illustrates a connection between electronic devices according to an embodiment of the present disclosure.

FIG. 2 illustrates a connection between electronic devices according to an embodiment of the present disclosure.

Referring to FIG. 2, the first electronic device 101 and the second electronic device 104 may transmit/receive information bidirectionally or unidirectionally through wireless communication means. The first electronic device 101 may be a portable electronic device such as a smart phone, and the second electronic device 104 may be a wearable device such as a watch type device or a glasses type device. However, embodiments of the present disclosure are not limited to the devices.

Further, although FIG. 2 illustrates mutual communication between the first electronic device 101 and the second electronic device 104, the first electronic device 101 may not communicate with the second electronic device 104 according to other embodiments of the present disclosure. For example, according to various embodiments of the present disclosure, the first electronic device 101 may be independently implemented or the second electronic device 104 may be independently implemented.

Figure 3:
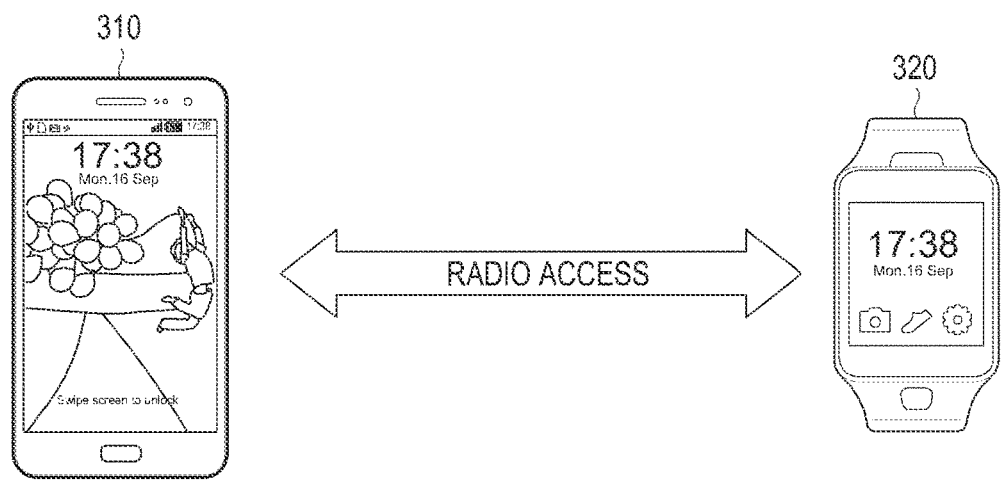
FIG. 3 illustrates an example of an electronic device according to an embodiment of the present disclosure.

FIG. 3 illustrates examples of electronic devices according to an embodiment of the present disclosure.

Referring to FIG. 3, the first electronic device 101 illustrated in FIG. 2 may be, for example, a smart phone 310, and the second electronic device 104 illustrated in FIG. 2 may be, for example, a watch type device 320. However, embodiments of the present disclosure are not limited to the devices.

As described above, the smart phone 310 and the watch type device 320 may communicate with each other by wired/wireless communication means, but embodiments of the present disclosure are not limited thereto.

According to various embodiments of the present disclosure, a music playing application may be executed in the smart phone 310, and the smart phone 310 may receive control information related to music playing from the watch type device 320 according to the execution of the application.

Accordingly, for example, when the guitar playing application is executed in the smart phone 310 and a user makes an action similar to a guitar playing action in a state where the user wears the watch type device 320, a motion of the watch type device 320 may be detected and control information corresponding to the guitar playing action may be transmitted to the smart phone 310. Detailed descriptions of various embodiments thereof will be described below.

Meanwhile, the following embodiments of the present disclosure will be described based on the smart phone 310 as an example of the first electronic device 101 and the watch type device 320 as an example of the second electronic device 104 as illustrated in FIG. 3. However, embodiments of the present disclosure are not limited to the devices.

Figure 4:
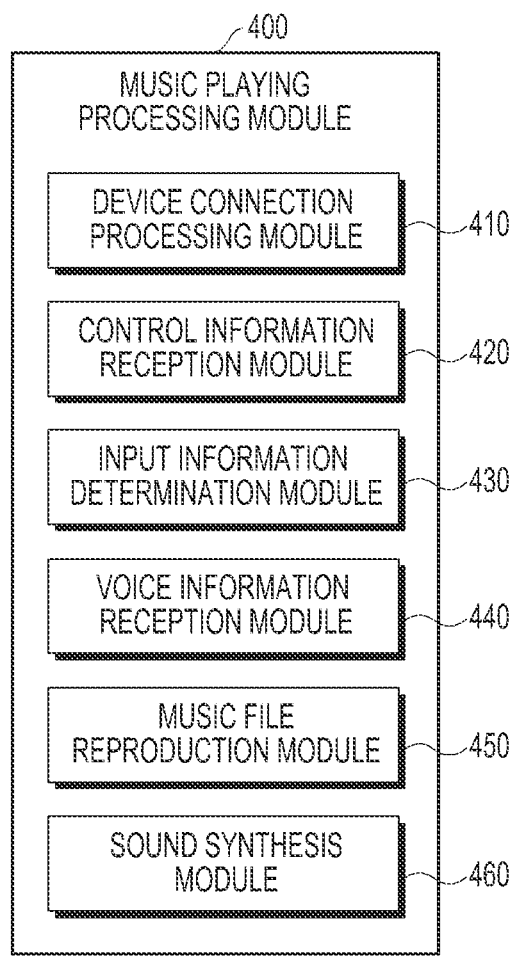
FIG. 4 illustrates an example of a configuration of a first electronic device according to an embodiment of the present disclosure.

FIG. 4 is a block diagram of a music playing processing module 400 installed in the electronic device (for example, the first electronic device 101) according to various embodiments of the present disclosure.

Referring to FIG. 4, the music playing processing module 400 may include at least one of a device connection processing module 410, a control information reception module 420, an input information determination module 430, a voice information reception module 440, a music file reproduction module 450, and a sound synthesis module 460.

The device connection processing module 410 may process a connection between the first electronic device 101 and the second electronic device 104. For example, when a music playing application (for example, a guitar playing application) is executed, the device connection processing module 410 may process the connection between the first electronic device 101 and the second electronic device 104 through wired/wireless communication means. Further, when the music playing application is executed and music playing starts, the device connection processing module 410 may process synchronization between the first electronic device 101 and the second electronic device 104. Accordingly, the first electronic device 101 may properly apply control information received from the second electronic device 104 according to accurate music playing timing.

The control information reception module 420 may perform a function of receiving the control information from the second electronic device 104 connected to the device connection processing module 410 through communication. The control information received from the second electronic device 104 may include information related to a music playing action. For example, according to various embodiments of the present disclosure, when the guitar playing application is executed, the control information may include information related to a stroke action of strumming a guitar string. Further, according to various embodiments of the present disclosure, the control information may include control information determined from motion information of the second electronic device 104 or the motion information itself. A detailed description thereof will be described below with reference to FIG. 8.

The input information determination module 430 may perform a function of determining a preset action that corresponds to information input from at least one of various input means (for example, a touch screen, a button, a camera, a sensor or the like) included in the first electronic device 101. For example, when the guitar playing application is executed and a touch signal is input through a touch screen included in the first electronic device 101, a preset action of the guitar playing application corresponding to the touch signal may be determined.

According to various embodiments of the present disclosure, when voice information input through a microphone during the execution of the music playing application is synthesized with output music, the voice information reception module 440 may perform a function of receiving the signal input through the microphone.

The music file reproduction module 450 may perform a function of reproducing a music file which is requested to be reproduced according to the execution of the music playing application. The music file to be reproduced may be determined by a user's selection or determined according to a preset method. Further, the music file to be reproduced may be provided from an external service through a network or may be a music file pre-stored in the first electronic device 101 by the user.

When the music file requested to be reproduced is output, the sound synthesis module 460 may perform a function of applying, to the music file, at least one of the control information received from the second electronic device 104, the input information input from the user, and the signal input through the microphone. For example, when the guitar playing application is executed, a guitar sound of a scale or a chord corresponding to the control information received from the second electronic device 104 or the input information input from the user may be synthesized with the music file. Further, in another example, the signal input through the microphone may be synthesized with the music file in real time and output when the music file is reproduced. A detailed description of concrete embodiments related to the sound synthesis module 460 will be described below.

Meanwhile, in FIG. 4, the music playing processing module 400 may be implemented as a module separate from the processor 120 of FIG. 1 or at least some functions of the music playing processing module 400 may be implemented within the processor 120. According to an embodiment of the present disclosure, all functions of the music playing processing module 400 may be included and implemented within the processor 120 or another processor. Further, the music playing processing module 400 may be implemented in a form of software or hardware. For example, when the music playing processing module 400 is implemented by software, the music playing processing module 400 may be stored in the memory 130 in a form of the applications 134.

An electronic device for executing a music playing application according to one of the various embodiments of the present disclosure may include a communication module configured to receive control information from a second electronic device connected through a wireless communication when the music playing application is executed, a processor configured to process the received control information to be applied to music data requested to be reproduced according to the execution of the music playing application, and an audio module configured to output the music data processed by the processor.

The control information may be generated in accordance with motion information of the second electronic device.

The motion information may be determined from a signal detected by at least one sensor included in the second electronic device.

The sensor may be at least one selected from a gesture sensor, a gyro sensor, an atmospheric pressure sensor, a magnetic sensor, an acceleration sensor, a grip sensor, a proximity sensor, a Red, Green, Blue (RGB) sensor, a biometric sensor, a temperature/humidity sensor, an illumination sensor, or an Ultraviolet (UV) sensor.

The music playing application may be a guitar playing application.

The control information may be information related to a stroke of at least one guitar string.

The information related to the stroke may be at least one piece of information selected from an intensity of the stroke, a direction of the stroke, a speed of the stroke, a pattern of the stroke, whether the stroke is generated, or a generation time of the stroke.

The information related to the stroke may be determined according to a change in a value measured by an acceleration sensor or a gyro sensor.

The electronic device may further include a touch pad configured to receive a user input, wherein the processor processes the user input made through the touch pad to correspond to at least one note of a scale or a chord.

The electronic device may further include a microphone, and the processor may further process a voice signal input through the microphone to be synthesized with the music data.

The electronic device may further include at least one sensor, and the processor may determine a motion of the electronic device based on a value sensed through the sensor and further process a preset sound effect to be applied to the music data in accordance with the determined motion.

The control information may include a signal detected by at least one sensor included in the second electronic device.

Figure 5:
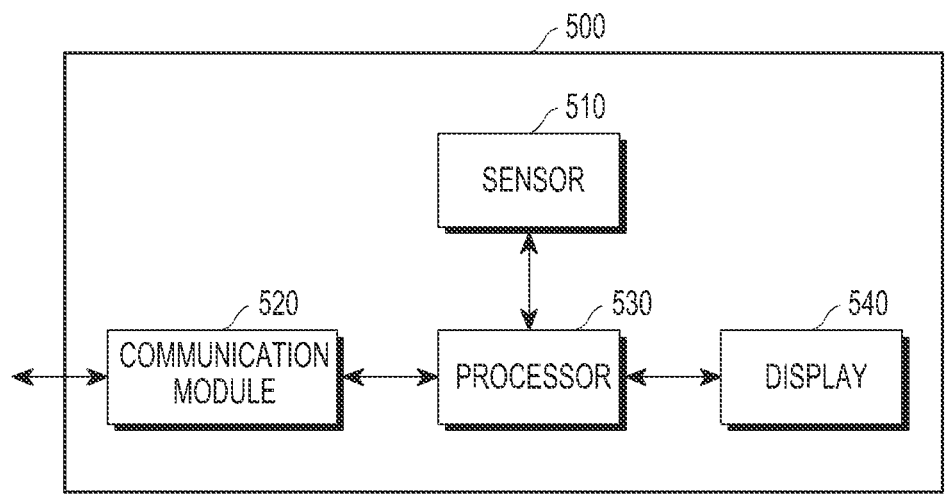
FIGS. 5 and 6 illustrate an example of a configuration of a second electronic device according to an embodiment of the present disclosure.

FIG. 5 illustrates an example of a configuration of a second electronic device according to an embodiment of the present disclosure.

Referring to FIG. 5, a second electronic device 500 according to an embodiment of the present disclosure may include at least one of a sensor 510, a communication module 520, a processor 530, and a display 540. Further, although FIG. 5 illustrates only one sensor 510, two or more sensors may be provided, and one of various types of sensors (for example, a gesture sensor, a gyro sensor, an atmospheric pressure sensor, a magnetic sensor, an acceleration sensor, a grip sensor, a proximity sensor, an RGB sensor, a biometric sensor, a temperature/humidity sensor, an illumination sensor, a UV sensor and the like) may correspond to the sensor 510.

The sensor 510 may detect a motion of the second electronic device 500 (for example, a wearable device). For example, as described in the following embodiments, the motion of the second electronic device 500 may be detected by the gyro sensor, the acceleration sensor or the like.

The processor 530 may transmit motion information detected by the sensor 510 to a first electronic device (for example, a smart phone) through a communication module 520 in real time. The processor 530 may directly transmit the detected motion information according to various embodiments of the present disclosure, or may transmit control information preset based on each motion according to an embodiment of the present disclosure. Accordingly, the first electronic device having received the motion information or the control information corresponding to the motion may determine the motion of the second electronic device 500 in real time.

According to an embodiment of the present disclosure, as described above, when the first electronic device executes the music playing application (for example, the guitar playing application), the second electronic device 500 may receive information related to the execution of the music playing application from the first electronic device through the communication module 520. The processor 530 may transmit motion information sensed by the sensor 510 or the control information to the first electronic device in real time according to the information related to the execution of the music playing application. Accordingly, the first electronic device may apply the motion of the second electronic device 500 to the music reproduction of the music playing application.

The display 540 may display information related to the execution of the music playing application on a screen according to a control of the processor 530. According to various embodiments of the present disclosure, the display 540 may not be included in the second electronic device 500. Further, the processor 530 of the second electronic device 500 may be configured to set motions of the second electronic device 500 and control information corresponding to each of the motions, and information related to the setting of the control information may be displayed on the display 540.

Further, according to various embodiments of the present disclosure, the processor 530 may receive synchronization information when being connected to the first electronic device through the communication module 520. The first electronic device and the second electronic device 500 may be synchronized by the synchronization information. Accordingly, when the music playing application is executed, a music reproduction time of the first electronic device and an application time of the control information according to the motion of the second electronic device may be synchronized and processed.

A memory (not shown) may store information related to the music playing application. For example, the memory may store control information mapped to the motion of the second electronic device 500, thresholds which are the reference for determining various types of motions, and synchronization information with the first electronic device.

Figure 6:
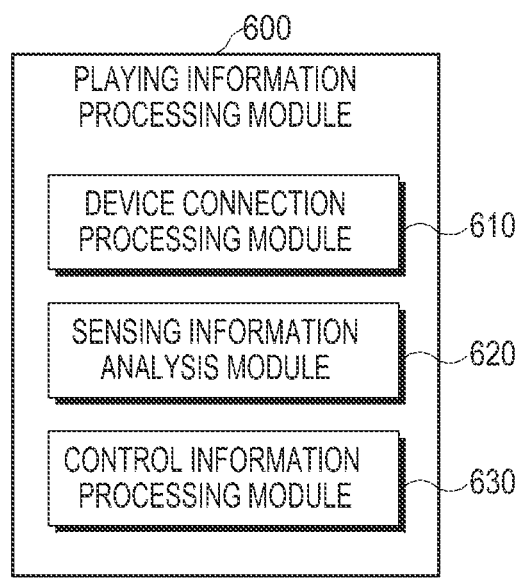

FIG. 6 is a block diagram of a playing information processing module 600 installed in the electronic device (for example, the electronic device 500) according to various embodiments of the present disclosure.

Referring to FIG. 6, the playing information processing module 600 may include at least one of a device connection processing module 610, a sensing information analysis module 620, and a control information processing module 630.

The device connection processing module 610 may process a connection with the first electronic device when the music playing application is executed in the first electronic device. Further, the device connection processing module 610 may process synchronization (for example, time synchronization) with the first electronic device.

The sensing information analysis module 620 may analyze information generated by sensing the motion of the second electronic device when the music playing application is executed. For example, the sensing information analysis module 620 may analyze a sensed signal from at least one of the various types of sensors described above and determine the motion of the second electronic device.

The control information processing module 630 may perform a function of generating preset control information according to motion information determined by the sensing information analysis module 620 and transmitting the generated control information to the first electronic device.

As described above, according to various embodiments of the present disclosure, the playing information processing module 600 of the second electronic device may transmit the determined motion information to the first electronic device or transmit control information preset according to the motion information to the first electronic device.

Meanwhile, in FIG. 6, the playing information processing module 600 may be implemented as a module separate from the processor 530 of FIG. 5 or at least some functions of the playing information processing module 600 may be implemented within the processor 530. According to an embodiment of the present disclosure, all functions of the playing information processing module 600 may be included and implemented within the processor 530 or another processor. Further, the playing information processing module 600 may be implemented in a form of software or hardware. For example, when the playing information processing module 600 is implemented by software, the playing information processing module 600 may be stored in the memory in a form of an application.

Hereinafter, music playing processing methods according to various embodiments of the present disclosure will be described with reference to FIGS. 7 to 9.

Figure 7:
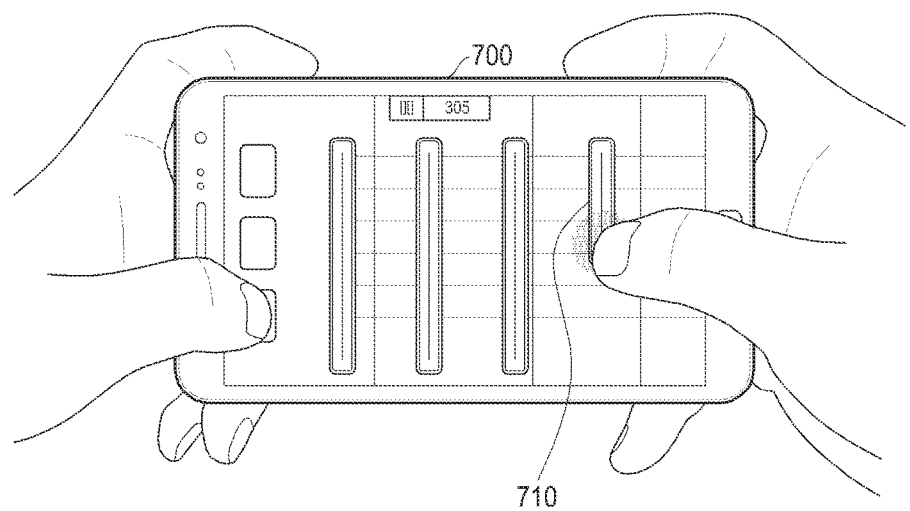
FIG. 7 illustrates an execution screen of a guitar playing application executed in an electronic device according to an embodiment of the present disclosure.

FIG. 7 illustrates an execution screen of a guitar playing application executed in an electronic device according to an embodiment of the present disclosure.

Referring to FIG. 7, when an electronic device 700 executes a guitar playing application among music playing applications, an image of guitar strings may be displayed. When a user touches a particular string via touch 710, a sound corresponding to the string may be synthesized with currently reproduced music and the synthesized sound and music are output.

Figure 8:
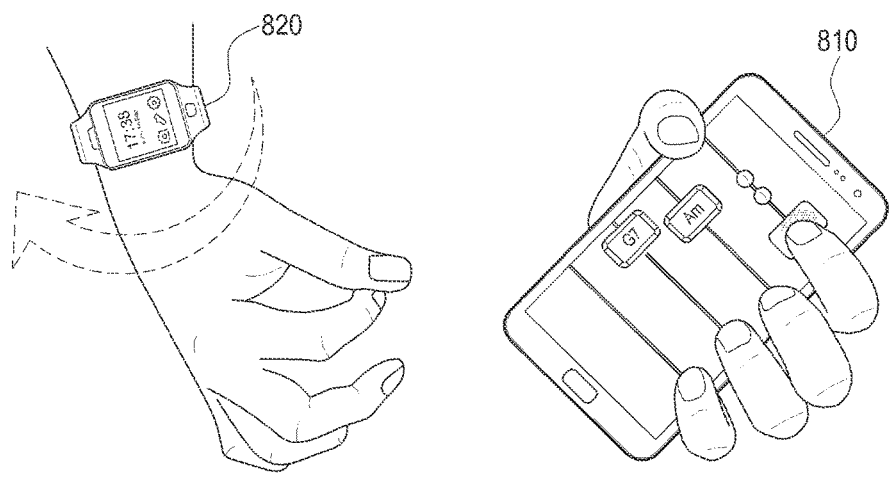
FIG. 8 illustrates an example of a guitar playing action using electronic devices according to an embodiment of the present disclosure.

FIG. 8 illustrates an example of a guitar playing action using electronic devices according to an embodiment of the present disclosure.

Referring to FIG. 8, a realistic music playing application (for example, a guitar playing application) may be provided through communication between a first electronic device (for example, a smart phone 810) and a second electronic device (for example, a watch type device 820).

More specifically, when the music playing application is executed in the smart phone according to various embodiments of the present disclosure, a User Experience (UE) similar to playing an actual instrument may be provided to a user.

For example, in actual guitar playing, a player holds a guitar neck to play a chord with one hand, and strokes guitar strings with the other hand. According to an embodiment of the present disclosure, when a guitar playing application is executed as illustrated in FIG. 8, the player may make an action of playing a chord by using fingers while holding the smart phone 810 with one hand and stroking guitar strings with the other hand while wearing the wearable device (for example, the watch type device 820) on a wrist. According to the action of stroking the guitar strings, the watch type device 820 worn on the wrist is moved, and the watch type device 820 may determine a type of the stroke by using various sensors.

Accordingly, when the guitar playing application is executed and thus music is reproduced in the smart phone 810 and the user makes a stroke action with one hand wearing the watch type device 820 according to the reproduced music, information related to the action may be transmitted to the smart phone 810 from the watch type device 820 to be applied to the reproduced music. According to such a principle, the user may enjoy a guitar playing game by making a motion and an action that are the same as those made when the user plays an actual instrument.

Figure 9:
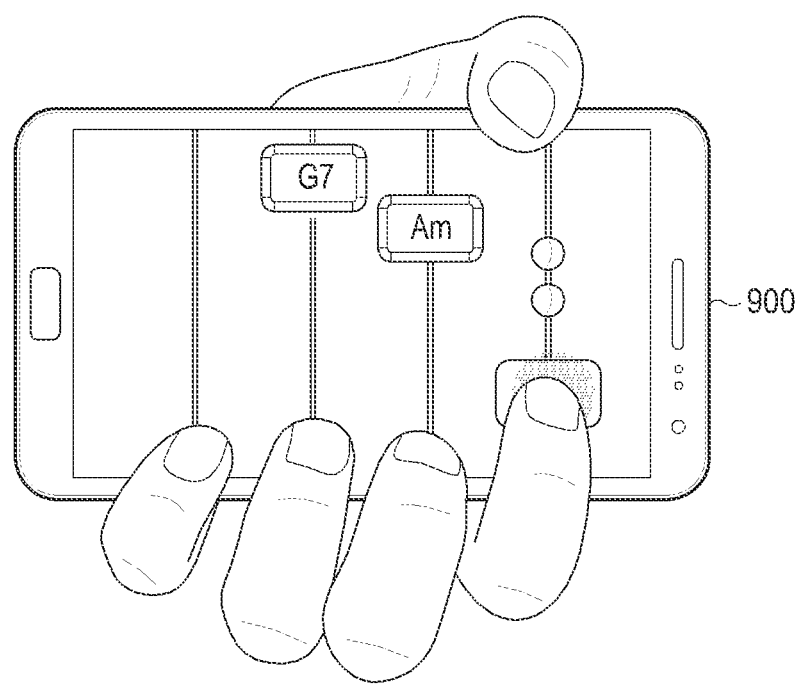
FIG. 9 illustrates an execution screen of a guitar playing application according to an embodiment of the present disclosure.

FIG. 9 illustrates an execution screen of a guitar playing application according to an embodiment of the present disclosure.

Referring to FIG. 9, when the guitar playing application is executed on an electronic device 900 and preset music is reproduced in the electronic device according to various embodiments of the present disclosure, indications corresponding to guitar chords or guitar notes set for the music may be displayed.

For example, an image corresponding to guitar strings may be displayed on a screen or guide lines to be touched by user's fingers may be displayed on the screen. For example, as the music is reproduced, a scale or chord image corresponding to a guitar note may be displayed on a line corresponding to each finger. The user may touch the scale or chord image displayed to correspond to each finger by using the finger, thereby generating an effect which is the same as actual guitar playing. Descriptions of various detailed embodiments related to the guitar playing application will be made with reference to FIG. 12.

Hereinafter, a process of operations performed by the electronic device will be described with reference to FIGS. 10 and 11.

Figure 10:
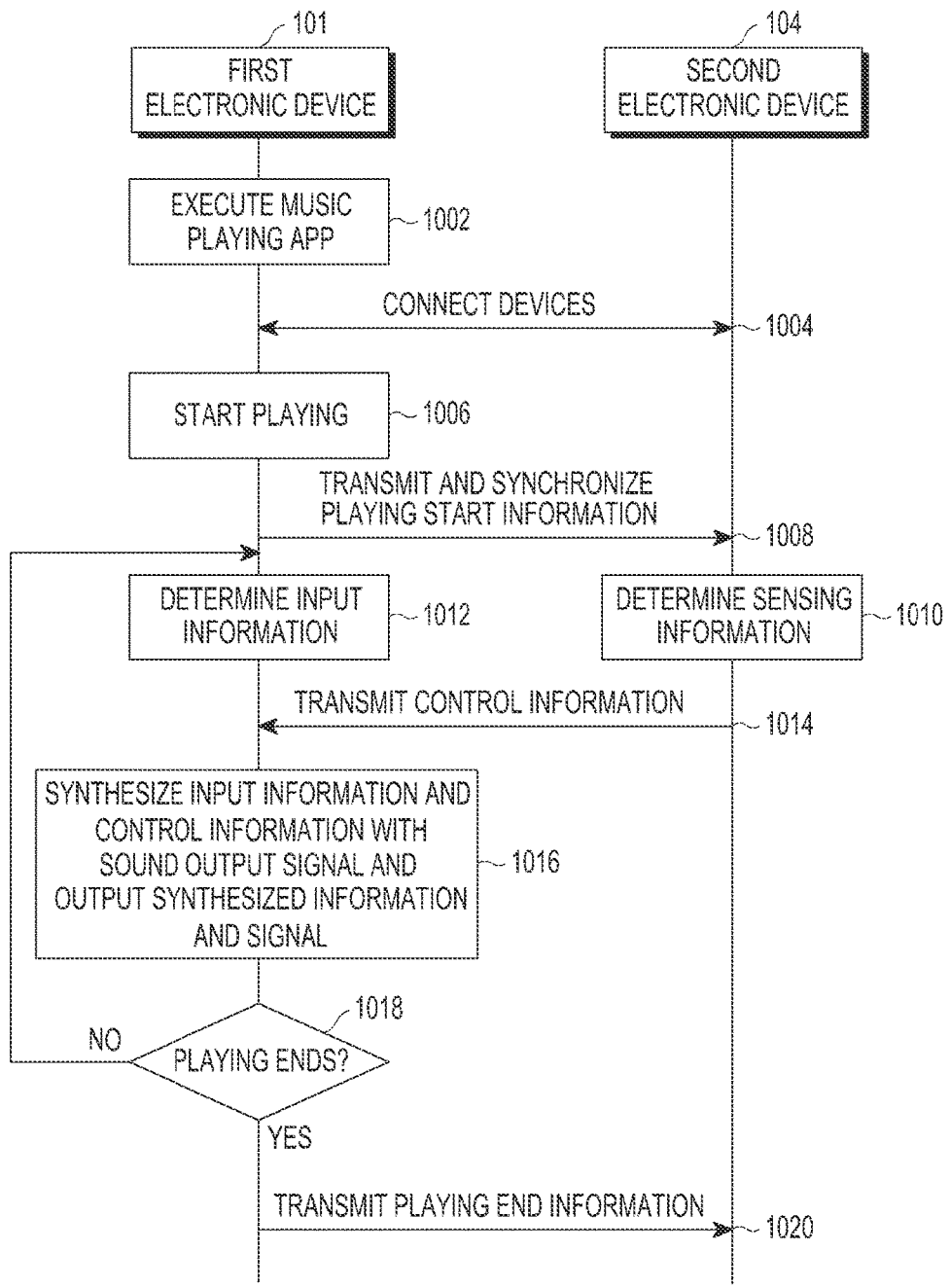
FIG. 10 is a signal flow diagram illustrating a process of operations between electronic devices according to an embodiment of the present disclosure.

FIG. 10 is a signal flow diagram illustrating a process of operations between electronic devices according to an embodiment of the present disclosure.

Referring to FIG. 10, when a music playing application installed in the first electronic device 101 (for example, a smart phone) is executed in operation 1002, the first electronic device 101 may be connected to the second electronic device 104 (for example, a wearable device (for example, a watch type device)) in operation 1004. The connection between the devices may be made before the execution of the music playing application.

When a music file requested to be reproduced is reproduced, music playing may start in operation 1006. Playing start information (or music reproduction start information) may be transmitted to the second electronic device 104 in operation 1008. Further, according to various embodiments of the present disclosure, synchronization information for synchronization between devices may be transmitted. The transmission of the synchronization information and a process of the synchronization between the devices may be performed before the reproduction of the music file or when the device connection in operation 1004 is made.

According to an embodiment of the present disclosure, the second electronic device 104 may determine sensing information according to a motion of the second electronic device in operation 1010 to determine a motion or an action of the second electronic device 104 based on the determination. In operation 1014, the second electronic device 104 may generate control information corresponding to the determined motion information and transmits the generated control information to the first electronic device 101.

According to various embodiments of the present disclosure, the control information transmitted to the first electronic device 101 from the second electronic device 104 may be variously set. For example, as described above, the control information may include motion information determined from the information sensed by at least one sensor of the second electronic device 104. Further, in an embodiment of the present disclosure, the control information may include information related to a stroke of at least one guitar string set in accordance with the determined motion information. For example, the information related to the stroke may be at least one selected from a strength of the stroke, a direction of the stroke, and a speed of the stroke. Further, the information related to the stroke may be stroke pattern information.

In an embodiment of the present disclosure, information sensed by at least one sensor of the second electronic device 104 (for example, a gesture sensor, a gyro sensor, an atmospheric pressure sensor, a magnetic sensor, an acceleration sensor, a grip sensor, a proximity sensor, an RGB sensor, a biometric sensor, a temperature/humidity sensor, an illumination sensor, a UV sensor, and the like) may be included in the control information to be transmitted. As described above, when the information sensed by the second electronic device 104 is transmitted to the first electronic device 101, the first electronic device 101 may determine a motion of the second electronic device 104 based on the sensed information received from the second electronic device 104 and apply a sound effect related to the stroke of at least one guitar string set in accordance with the determined motion to the currently reproduced music.

In an embodiment of the present disclosure, the control information may include information on whether a stroke action determined from the information sensed by the second electronic device 104 is made or information on a generation time of the stroke action. When the control information indicating whether the stroke action is made or the generation time of the stroke action is transmitted to the first electronic device 101, the first electronic device 101 may reflect the transmitted information on whether the stroke action is made or the generation time of the stroke action in calculating a game score of the music playing application.

The first electronic device 101 may determine information input through various input means (for example, a touch screen) in operation 1012, and apply the input information and the transmitted control information to a sound signal to be output and output the sound signal in operation 1016. For example, when a guitar playing application corresponding to an example of the music playing application is executed, the input information of the first electronic device 101 may be mapped to a preset scale or chord and the motion information of the second electronic device 104 determined from the control information may be mapped to a stroke type of the guitar. Accordingly, a guitar sound corresponding to the stroke of the mapped scale or chord may be generated, and the generated guitar sound may be synthesized with a reproduced music sound and the synthesized sounds are output.

Further, according to various embodiments of the present disclosure, the guitar sound may be output through the second electronic device 104 (for example, the wearable device), and the currently reproduced music file sound (for example, a music sound from which the guitar sound is removed) may be output through the first electronic device 101 (for example, the smart phone).

When the playing ends (or the reproduction of music ends) in operation 1018, playing end information (or music reproduction end information) may be transmitted to the second electronic device in operation 1020 to end the playing.

Figure 11:
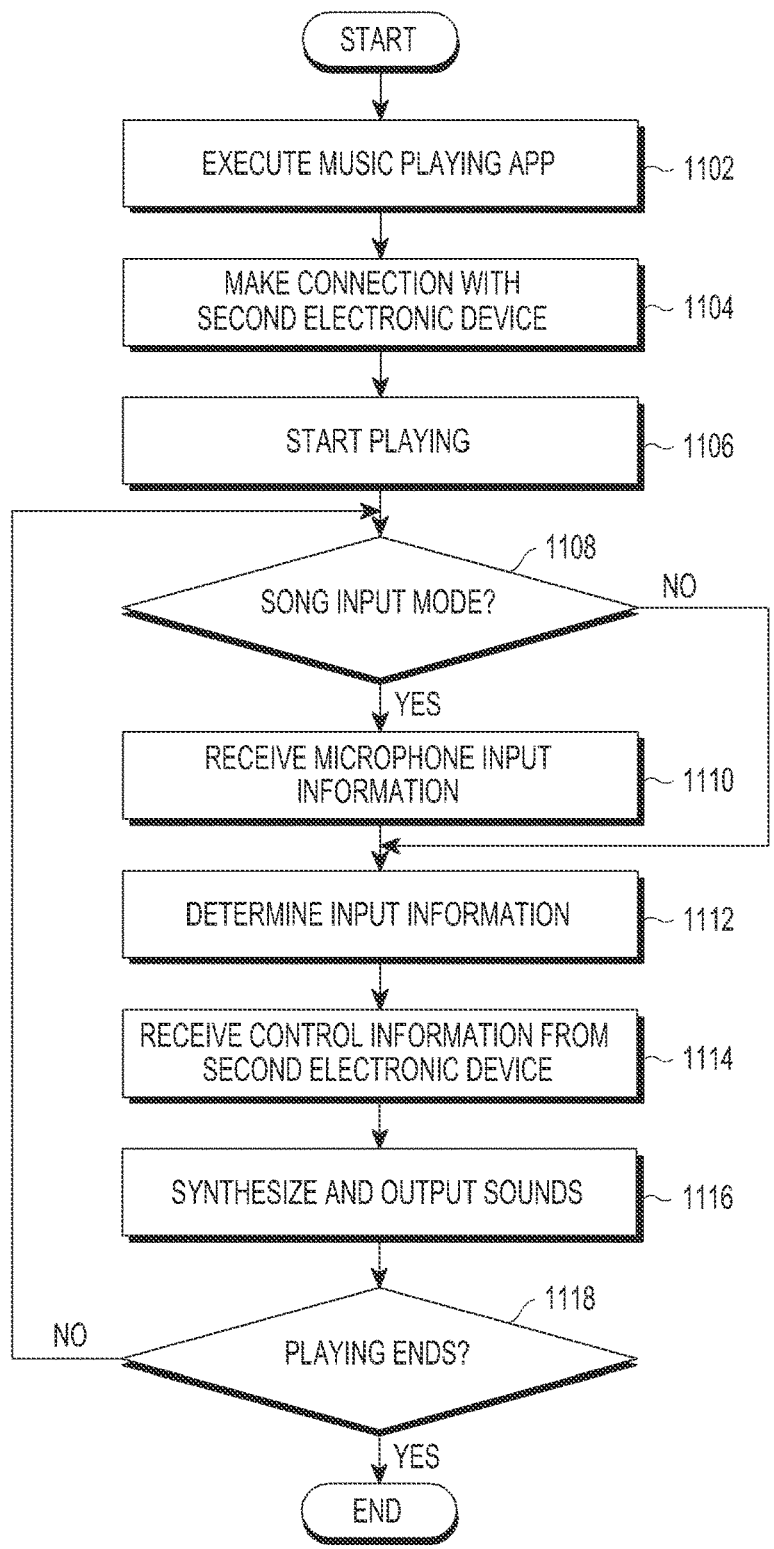
FIG. 11 is a flowchart illustrating an operation process of an electronic device according to an embodiment of the present disclosure.

FIG. 11 is a flowchart illustrating a process of operations of the electronic device according to an embodiment of the present disclosure.

Referring to FIG. 11, a music playing application (for example, a guitar playing application) installed in the first electronic device may be executed in operation 1102 and the first electronic device may be connected to the second electronic device in operation 1104. The connection with the second electronic device may be made before the execution of the music playing application.

When the playing starts in operation 1106 (or music requested to be reproduced is reproduced), music playing may be performed according to a preset playing mode. For example, it may be determined whether the currently set playing mode is a song input mode in operation 1108. When the mode is the song input mode, information input through the microphone may be received in operation 1110. When the mode is not the song input mode, information input through the microphone may not be received.

According to the reproduction of music, information input through an input means (for example, a touch screen) of the first electronic device is determined in operation 1112. Further, control information (or motion information) may be received from the second electronic device in operation 1114.

In operation 1116, the information input into the first electronic device or the control information (or motion information) received from the second electronic device may be synthesized with a sound of the currently reproduced music and the synthesized information and sound may be output. According to various embodiments, the synthesized music may be output through a speaker or earphones of the first electronic device.

The processes of operations 1108 to 1116 may be continuously performed until the playing ends (or music reproduction ends). It may be determined whether the playing ends (or music reproduction ends) in operation 1118 to end the playing process. The processes of operations 1108 to 1116 may be performed in real time regardless of sequences while the playing is being made, and a plurality of operations may be simultaneously or sequentially performed.

Meanwhile, at least one of the operations illustrated in FIG. 10 or 11 may be omitted, or at least one other operation may be added between the operations. In addition, the operations of FIG. 10 or 11 may be performed in the shown sequence. Alternatively, an execution sequence of at least one operation may be exchanged with an execution sequence of another operation.

A method of playing music in an electronic device according to various embodiments of the present disclosure may include receiving control information from a second electronic device connected through a wireless communication when a music playing application is executed, processing the received control information to be applied to music data requested to be reproduced according to the execution of the music playing application, and outputting the processed music data.

The control information may be generated in accordance with motion information of the second electronic device.

The motion information may be determined from a signal detected by at least one sensor included in the second electronic device.

The sensor may be at least one selected from a gesture sensor, a gyro sensor, an atmospheric pressure sensor, a magnetic sensor, an acceleration sensor, a grip sensor, a proximity sensor, an RGB sensor, a biometric sensor, a temperature/humidity sensor, an illumination sensor, or a UV sensor.

The music playing application may be a guitar playing application.

The control information may be information related to a stroke of at least one guitar string.

The information related to the stroke may be at least one piece of information selected from an intensity of the stroke, a direction of the stroke, a speed of the stroke, a pattern of the stroke, whether the stroke is generated, or a generation time of the stroke.

The information related to the stroke may be determined according to a change in a value measured by an acceleration sensor or a gyro sensor.

The method may further include receiving a user input through a touch pad and processing the user input made through the touch pad to correspond to at least one note of a scale or a chord.

The method may further include processing a voice signal input through the microphone to be synthesized with the music data.

The method may further include determining a motion of the electronic device based on a value sensed through the sensor and processing a preset sound effect to be applied to the music data in accordance with the determined motion.

The control information may include a signal detected by at least one sensor included in the second electronic device.

Hereinafter, various embodiments of the present disclosure applied to a guitar playing application will be described with reference to FIGS. 12 to 15.

Figure 15:
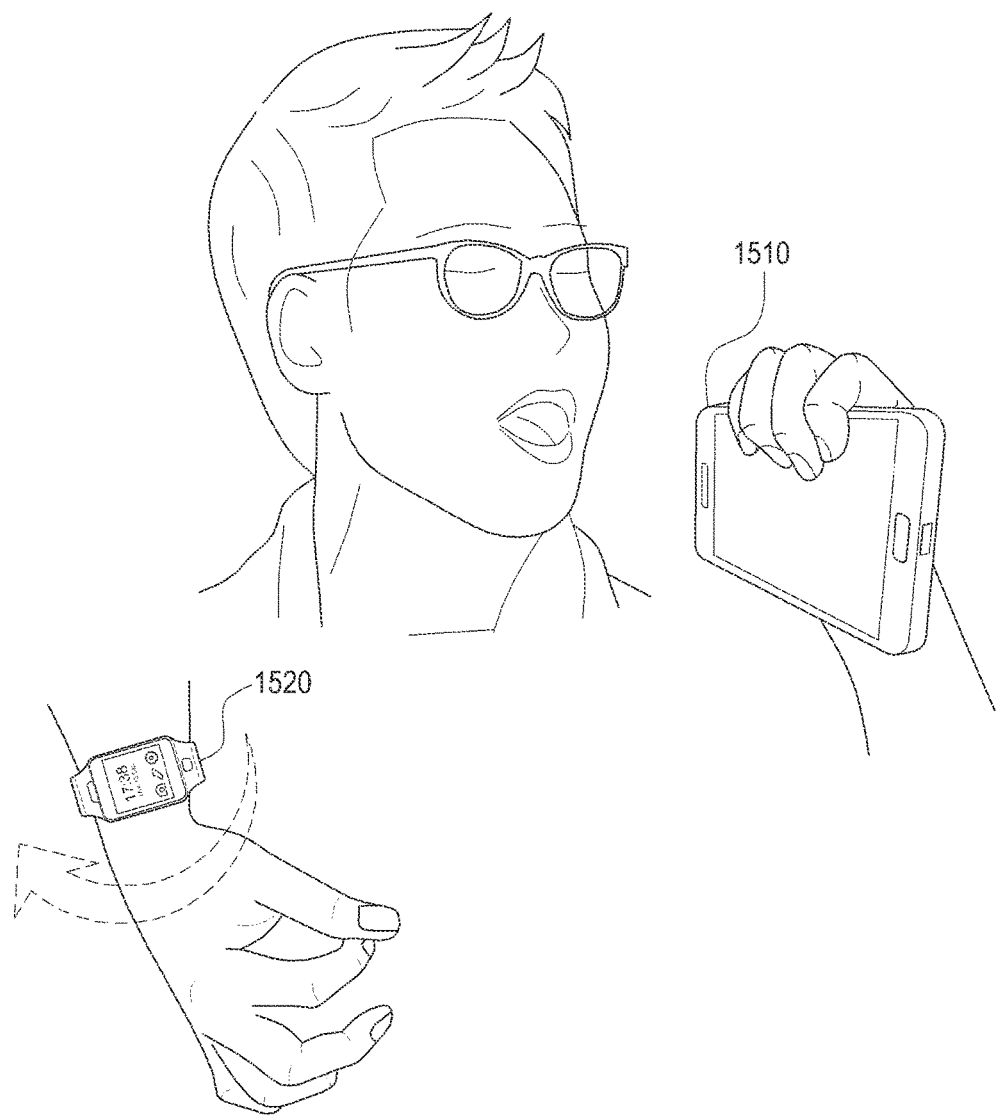
FIG. 15 illustrates an example of a guitar playing action using electronic devices according to an embodiment of the present disclosure.

FIG. 15 illustrates an example of a guitar playing action using electronic devices according to an embodiment of the present disclosure.

An application example of the first electronic device will be first described, and then an application example of the second electronic device will be described.

As described, the first electronic device (for example, the smart phone 1510) may download a music file to be reproduced to play a guitar from a server and store the downloaded music file in a memory. The server may store music files that are played using a plurality of instruments and recorded and stored using a multi-track, and may provide the stored music files according to a request from each electronic device.

The user may select at least one music file and download the selected music file from the server through the first electronic device. According to various embodiments, a music file to be used for playing music may be purchased from a particular application market (for example, a music file market).

The first electronic device may configure a connection with a second electronic device (for example, a watch type device 1520) to interwork with the first electronic device according to execution of a music playing application (for example, a guitar playing application). The connection between the first electronic device and the second electronic device may be made by various wired/wireless communication means as described above. For example, the connection between the devices can be made through short-range communication (more specifically, BT).

According to the execution of the music playing application, the user may select an instrument and a music file to be used for performance by the first electronic device. Further, the user may configure various modes which can be provided in the performance. Based on instrument information selection, the processor may find a track, in which the selected instrument information is stored, from the selected music file and may mute the reproduced music.

When a playing start command is input, the first electronic device may start a synchronization process with the second electronic device. The synchronization process may prevent a delay which may be generated according to a communication state between the first electronic device and the second electronic device. As described above, through the synchronization, it is possible to process or correct a timing error generated when it is determined whether a game mission is completed.

The first electronic device may transmit playing start information (or playing start command) to the second electronic device by using wired/wireless communication (for example, preset short-range communication) and reproduce a music file to be reproduced. Further, the first electronic device may display information related to the playing on the display (for example, a touch screen).

For example, the information may be configured in the form of a Musical Instrument Digital Interface (MIDI) file, and a guitar instrument track of the MIDI file may be reproduced in a mute state according to the start of playing of the music file. The first electronic device may display a screen related to the playing and detect an input (for example, a touch input on the touch screen) from the user.

Simultaneously, the processor may receive a generated control signal from the second electronic device connected through the communication and apply the control signal to the music file being reproduced.

Hereinafter, various embodiments of outputting a sound by executing a guitar playing application and applying various pieces of collected information to the music file during a playing process will be described. However, the present disclosure is not limited to the following embodiments, and the embodiments can be combined with each other.

For example, when the first electronic device detects a touch input, the electronic device determines whether a chord button or a note button corresponding to a touched position is touched. When control information is received from the second electronic device through short-range communication in a state where the chord button or the note button is touched, a sound to be output may be selected. For example, the type of the sound to be output may be determined by control information determined according to the chord button/note button and an action or a gesture detected through the second electronic device. The first electronic device may pre-store a table to determine the type of a sound to be reproduced and a sound effect according to a predefined input value and pattern, and apply the input information to the reproduction of a music file with reference to the stored table according to the music playing.

For example, when the touch input of the first electronic device and the control command of the second electronic device are received, sound file information is extracted from the stored table. A sound effect preset for the sound file may be mixed with the reproduced music based on the extracted information, and the mixed sound effect and music may be output through a speaker. Further, according to an embodiment of the present disclosure, as illustrated in FIG. 15, voice information input through a microphone by the user of the music playing game may be mixed with the reproduced music.

According to various embodiments of the present disclosure, when the guitar playing application is manufactured in the form of a game, whether a game mission is completed may be detected when a touch input of the first electronic device and a control signal of the second electronic device are received. Accordingly, a result may be determined based on a timing when the inputs are generated according to execution of the game of the guitar playing application. The determination result may be configured in various ways. For example, the user input may be determined in the form of perfect, great, good, poor, miss, and the like.

For example, the user may make a touch input on a chord button or a note button in a touch area of the touch screen at a timing when the user should make an input for playing while holding the first electronic device (for example, a smart phone 1510) with one hand. Simultaneously, when control information is received from the second electronic device, determination on the corresponding note may be made according to the accuracy of the input. Further, according to the determination, a preset score may be acquired, and the determination result may be displayed in real time on the screen of the first electronic device or the second electronic device.

According to various embodiments of the present disclosure, in order to provide a realistic guitar playing experience to the game user, the first electronic device may receive inputs according to finger touches in a state where the user holds the first electronic device (for example, a smart phone 810) with one hand as illustrated in FIG. 8. Accordingly, the first electronic device may receive touches according to four fingers of the user except for a thumb in a state where the user holds the first electronic device. Further, according to various embodiments, in a state where the user holds the first electronic device, three or four fingers may be simply provided as an input means to easily make finger touch inputs. Accordingly, the user may enjoy only an action of simple guitar playing without the complexity of chord inputs.

Referring to FIG. 9, according to various embodiments of the present disclosure, a guitar playing screen may be controlled as follows.

1. Chord information and note information may be extracted with reference to music information.

2. The chord information and the note information may be provided by a chord button and a note button for a game, respectively. At this time, the chord button and the note button may be distinguished by their shapes.

3. The chord button and the note button appear in an upper portion of the display before a playing timing. As the playing timing arrives, the chord button and the note button gradually move to a low touch area. The numbers of chord buttons or note buttons may be three to five according to the number of fingers for touches.

4. Positions of rails of the chord buttons/note buttons may be determined by various algorithms. For example, chords are arranged according to a chord generation frequency in music information, and then each chord may be allocated to a rail number through a 3 or 4 modular operation. Specifically, in the 3 modular operation, A, B, C, D, E, F, and G chords may be allocated to no. 1, 2, 3, 1, 2, and 3 rails, respectively. Further, according to various embodiments, chords having the smallest frequency may be allocated to a no. 4 rail, thereby minimizing a touch input of a little finger having the most unstable position.

In another example, three main chords may be allocated to three rails such as no. 1, 2, and 3 rails, and a chord having the smallest use frequency may be allocated to a no. 4 rail. In still another example, chords and notes may be randomly allocated to the no. 1 to 4 rails or no. 1 to 3 rails.

5. According to various embodiments of the present disclosure, a ~~ (TAB) music information and guitar rhythm information used for guitar playing may be applied to the guitar playing application. The music information may include information on whether there is a stroke or picking up/down of a guitar, information on a beat (down beat and up beat), and information on syncopation. Based on various pieces of guitar playing related information, chord buttons and note buttons may be differently displayed.

The various embodiments of the present disclosure described above are related to examples implemented in the first electronic device, and various embodiments of the present disclosure described below are related to examples implemented in the second electronic device.

The second electronic device may be a wearable device (for example, a watch type device). A connection between the first electronic device and the second electronic device may be first made. When playing starts, synchronization between the first electronic device and the second electronic may be configured. For example, the second electronic device may receive a playing execution and synchronization request and a playing start command from the first electronic device. As described above, there may be a delay according to a communication state between the first electronic device and the second electronic device, and an error may occur due to the delay. Accordingly, the error due to the delay may be processed through the synchronization between the first electronic device and the second electronic device.

The second electronic device may include various types of sensors. At least one sensor may be activated according to the start of the playing. For example, a gyro sensor or an acceleration sensor installed in the second electronic device may be activated. When the user shakes an arm as if the user makes a guitar playing action in a state where the user wears a watch type device, which corresponds to the second electronic device, on a wrist as illustrated in FIG. 8, a measurement value input through the sensor may be stored by the shaking action. The sensed measurement value may be compared with a preset threshold to determine whether the user's action is a preset gesture or a preset action. Based on a result of the determination, when the user's action is the preset action or gesture, determined action or gesture information (or motion information) may be transmitted to the first electronic device. Further, according to an embodiment of the present disclosure, the determined action or gesture information (or motion information) may be converted to preset control information and transmitted to the first electronic device.

According to various embodiments of the present disclosure, when the user makes a gesture of stroking or picking a guitar with one hand while pressing a chord button or a note button selected by the player with a finger of the other hand on the touch screen of the first electronic device, a guitar sound of strumming the corresponding chord or note may be output.

For example, the stroke or picking gesture of the user may be detected by a change in values of the acceleration sensor and the gyro sensor of the watch type device worn by the player. For example, when the user makes a stroke or picking gesture in a state where the watch type device is worn on a right hand, a change in y axis acceleration and yaw rotation may be most significantly detected at the same time by the acceleration sensor or the gyro sensor included in the watch type device. Accordingly, various guitar playing actions of the user may be determined by comparing the change in the measurement values through the two sensors with a preset threshold. For example, an intensity, speed, or direction of the stroke (or picking) may be determined as the guitar playing action of the user.

More specifically, pattern matching for determining actions of values measured through sensors may be made in real time. Further, the pattern of the gesture corresponding to the measurement value sensed by each sensor may be determined by a predefined table. Control information (or control command) corresponding to the values measured by the sensors may be determined by the predetermined pattern, and the determined control information may be transmitted to the first electronic device.

Figure 12:
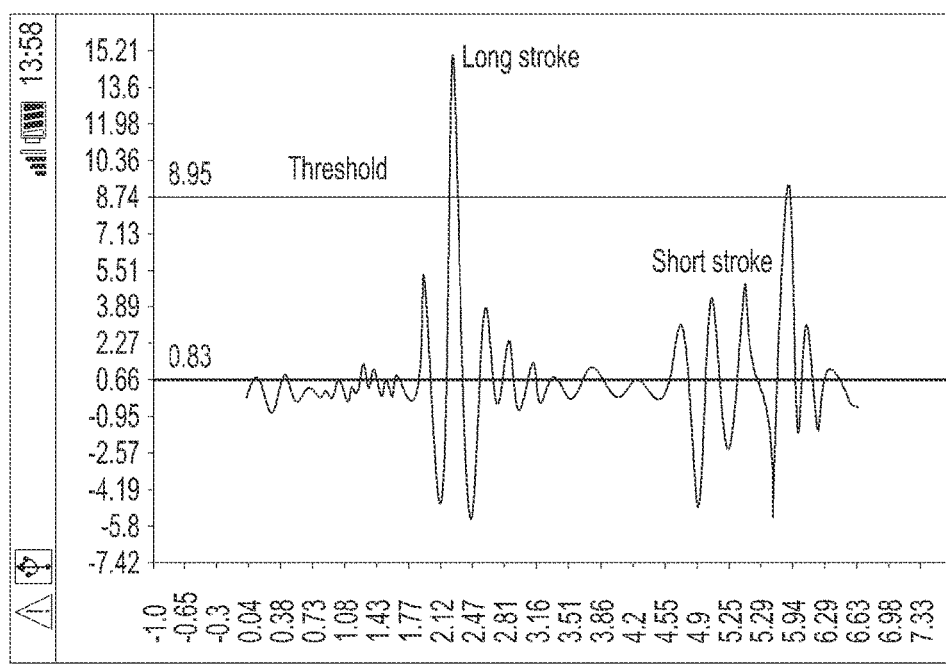
FIGS. 12, 13, and 14 are graphs illustrating a change in a sensor value for determining a gesture of an electronic device according to an embodiment of the present disclosure.
Figure 13:
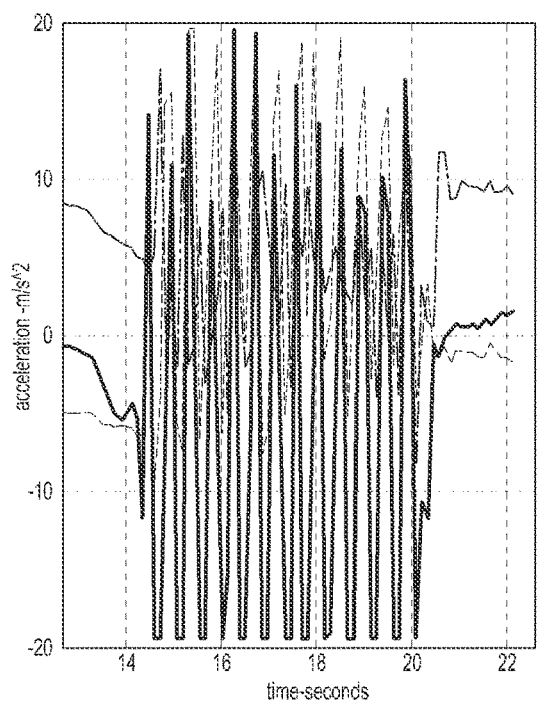
Figure 14:
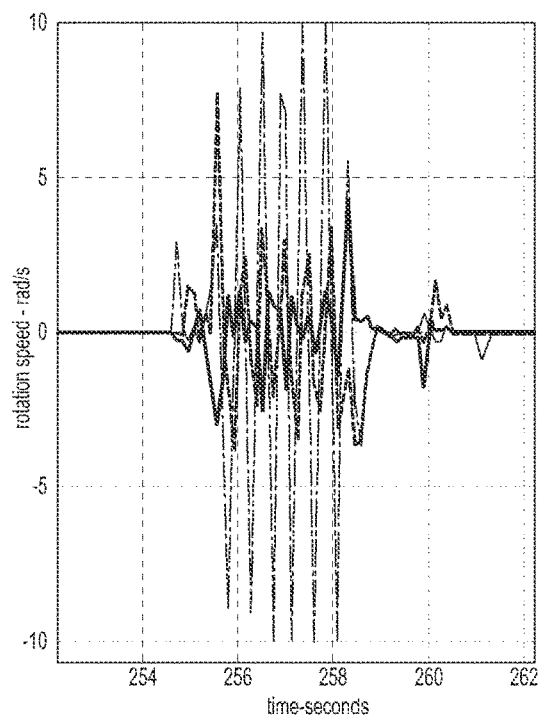

FIGS. 12, 13, and 14 are graphs illustrating a change in a sensor value for determining a gesture of the electronic device according to an embodiment of the present disclosure.

Referring to FIG. 12, the number of guitar strings to be stroked for guitar playing may be determined by determining a change in Y axis acceleration and yaw rotation. For example, as illustrated in FIG. 12, when a value measured by the sensor is between a first threshold and a second threshold, it is determined as a short stroke and thus control information for combining sound effects of strumming three guitar strings may be generated. Further, when the value measured by the sensor is larger than the second threshold, it is determined as a long stroke and thus control information corresponding to sound effects of strumming six guitar strings may be generated. The generated control information may be transmitted to the first electronic device.

According to various embodiments of the present disclosure, referring to FIGS. 13 and 14, an intensity of a stroked guitar sound may be determined according to the change in the Y axis acceleration and yaw rotation per unit time. For example, according to a user's gesture, a guitar playing technique is divided into a weak effect of weakly strumming a guitar string and a strong effect of strongly strumming a guitar string. It is assumed that a factor for determining an intensity of a guitar playing stroke or picking is a stroke speed and power of strumming a string by a player. Accordingly, when a change per unit time is between a first threshold and a second threshold based on a value measured by the sensor according to a user's gesture, control information corresponding to a first intensity stroke or picking sound effect may be generated. Further, when the change per unit time is larger than the second threshold, control information corresponding to a second intensity stroke or picking sound effect may be generated. The generated control information may be transmitted to the first electronic device.

Further, according to various embodiments of the present disclosure, the intensity of the stroke in the guitar playing may be determined by a pattern of strokes. For example, referring to FIG. 13, a change in the acceleration sensor may have a pattern in which there is a momentary pause between a first down stroke and a second down stroke corresponding to the next stroke of the first down stroke. At this time, a minimum value part of the measurement values by the acceleration sensor may be indicated by two inflection points, not one inflection point, and the two inflection points have a lower serrated waveform having no change therebetween. Such a tendency is remarkably shown in music using a guitar cutting playing style having a strong down stroke. Accordingly, when the change in the acceleration sensor pauses at the minimum inflection point based on the measurement values by the acceleration sensor, control information corresponding to a first intensity stroke (relatively strong stroke) may be generated. When a direction of the change in the acceleration sensor changes in the minimum inflection point, control information corresponding a second intensity stroke (relatively weak stroke) may be generated.

Further, according to various embodiments of the present disclosure, a direction of the change in the yaw rotation of the gyro sensor may determine a direction of a guitar string stroke in the guitar playing. TAB music information and guitar rhythm information used for the guitar playing are used, an up stroke and a down stroke may be distinguished. Accordingly, it may be determined whether a user's gesture is an up stroke or a down stroke according to the direction of the change in the measurement value by the gyro sensor.

For example, when a direction change of the yaw rotation is "−" based on the measurement value by the gyro sensor, it is determined as the up stroke and thus control information corresponding to a first sound may be generated. Further, according to the control information corresponding to the first sound, sounds of nos. 1, 2, and 3 guitar strings are sequentially synthesized and output from the first electronic device. When the direction change of the yaw rotation is "+" based on the measurement value by the gyro sensor, it is determined as the down stroke and thus control information corresponding to a second sound may be generated. Further, according to the control information corresponding to the second sound, sounds of nos. 3, 2, and 1 guitar strings are sequentially synthesized and output from the first electronic device.

When there are pieces of sound control information predefined according to various user's gesture patterns determined based on signals detected by various sensors, the second electronic device may generate corresponding control information and transmit the control information to the first electronic device. According to various embodiments of the present disclosure, a TAB music information and guitar rhythm information used for guitar playing may be applied. The music information may include information on whether there is a stroke or picking up/down of a guitar, information on a down beat and an up beat, and information on syncopation Accordingly, when the first electronic device receives control information by various gestures from the second electronic device, the first electronic device may generate sound effects of guitar sounds with reference to the music information corresponding to the control information and output the generated sound effects of the guitar sounds and reproduced music which are mixed with each other.

According to various embodiments of the present disclosure, when the user makes a gesture corresponding to stroke information by using the second electronic device in a state where the user presses a chord button on the touch screen of the first electronic device, the gesture may be determined as a stroke for chord playing and a chord sound generated by a combination of a plurality of guitar strings may be output. According to an embodiment of the present disclosure, when the user makes a gesture corresponding to a stroke by using the second electronic device in a state where the user presses a note button on the touch screen of the first electronic device, the gesture may be determined as a picking gesture. Accordingly, a picking sound corresponding to one guitar string may be synthesized and output regardless of the user's stroke gesture.

Further, according to various embodiments of the present disclosure, in music using an Arpeggio playing style, finger picking may be frequently generated unlike the above described stroke playing style. For example, in a music setting mode for the Arpeggio playing style, the user may output a guitar sound corresponding to an Arpeggio effect by making one stroke or picking gesture in the second electronic device in a state where the user presses a chord button in the first electronic device.

Although the aforementioned various embodiments of the present disclosure have the gesture identification method using the acceleration sensor or the gyro sensor as an example, a magnetic field sensor may be added to increase accuracy of recognition. As a result, an error in the gesture may be reduced by using magnetic field direction information.

Further, according to various embodiments of the present disclosure, various sound effects may be reflected in reproduced music by detecting a motion of the first electronic device through various sensors included in the first electronic device. For example, when a motion of shaking the first electronic device up and down in a state where a particular note or chord is touched on the touch screen of the first electronic device, a guitar sound corresponding to a tremolo playing style may be applied to the reproduced music. In another example, when a motion of moving the first electronic device from down to up in a state where a particular note or chord is touched on the touch screen of the first electronic device, a guitar sound corresponding to a wailing effect may be applied to the reproduced music.

The various embodiments of applying various guitar playing effects to reproduced music by detecting a motion of the first electronic device or the second electronic device have been described. However, various embodiments of the present disclosure are not limited to the aforementioned embodiments. After various types of motions of the second electronic device are determined, various preset sound effects corresponding to respective motions may be applied to the reproduced music.

Figure 16:
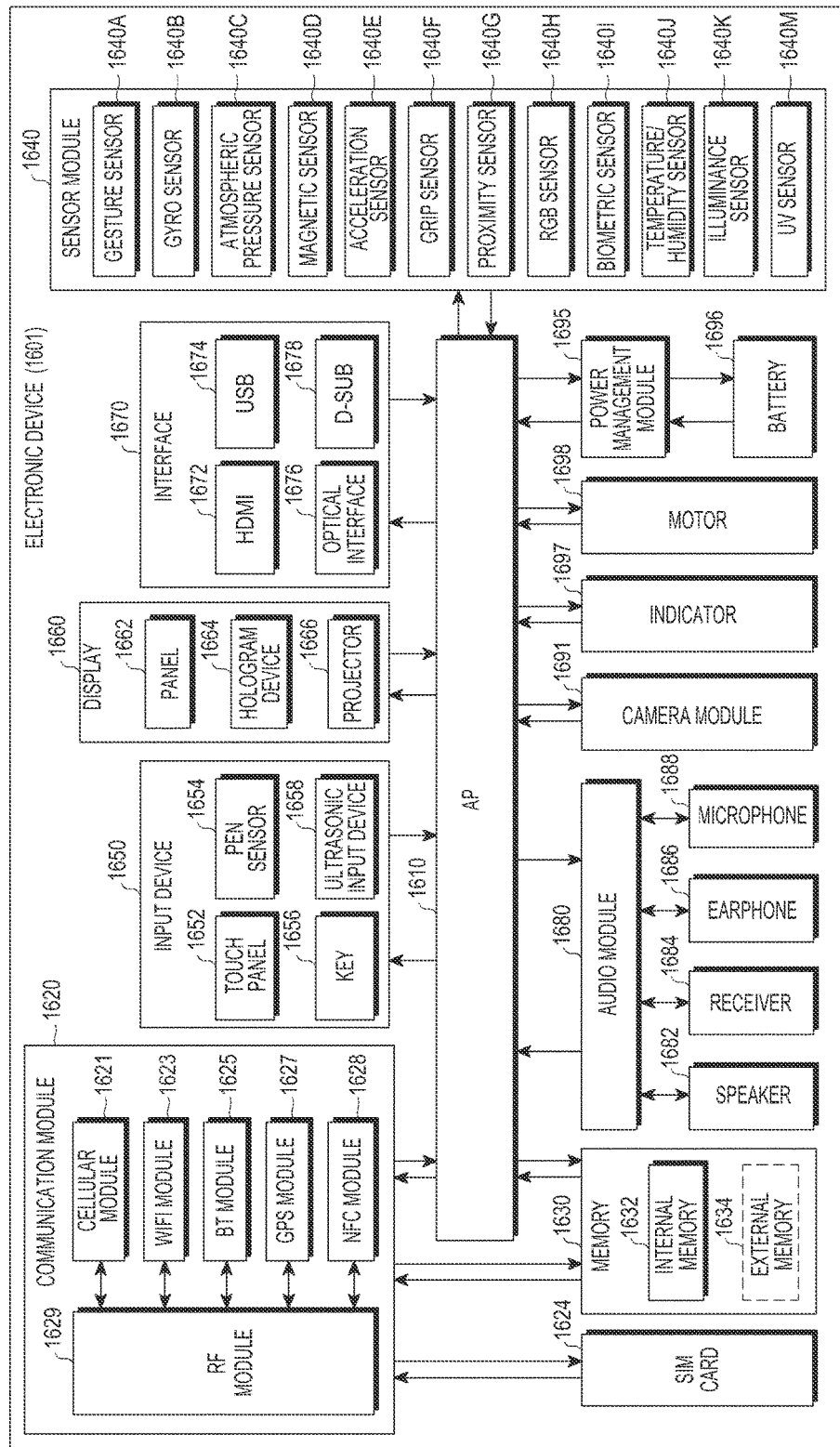
FIG. 16 is a block diagram illustrating a detailed structure of an electronic device according to an embodiment of the present disclosure.

FIG. 16 illustrates a block diagram of an electronic device 1601 according to various embodiments of the present disclosure. The electronic device 1601 may constitute, for example, all or a part of the first electronic device 101 illustrated in FIG. 1.

Referring to FIG. 16, the electronic device 1601 may include at least one of an Application Processor (AP) 1610, a communication module 1620, a Subscriber Identifier Module (SIM) card 1624, a memory 1630, a sensor module 1640, an input device 1650, a display 1660, an interface 1670, an audio module 1680, a camera module 1691, a power management module 1695, a battery 1696, an indicator 1697, and a motor 1698.

The AP 1610 may control a plurality of hardware or software components connected thereto by driving an operating system or an application program, process various types of data including multimedia data, and perform calculations. The AP 1610 may be implemented by, for example, a System on Chip (SoC). According to an embodiment of the present disclosure, the AP 1610 may further include a graphic processing unit (GPU) (not shown).

The communication module 1620 (for example, the communication interface 160) may perform data transmission/reception in communication between the electronic device 1601 (for example, the first electronic device 101) and other electronic devices (for example, the second electronic device 104 and the server 106) connected over a network. According to an embodiment, the communication module 1620 may include a cellular module 1621, a Wi-Fi module 1623, a BT module 1625, a GPS module 1627, an NFC module 1628, and a radio frequency (RF) module 1629.

The cellular module 1621 may provide a voice call, a video call, a message service, or an interne service through a communication network (for example, LTE, LTE-A, CDMA, WCDMA, UMTS, WiBro, GSM, or the like). Also, the cellular module 1621 may identify and authenticate an electronic device in a communication network using, for example, a subscriber identification module (for example, the SIM card 1624). According to an embodiment, the cellular module 1621 may perform at least a part of functions that may be provided by the AP 1610. For example, the cellular module 1621 may perform at least a part of the multimedia control function.

According to an embodiment, the cellular module 1621 may include a communication processor (CP). In addition, for example, the cellular module 1621 may be implemented by a SOC. In FIG. 16, the components such as the cellular module 1621 (for example, a communication processor), the memory 1630, the power management module 1695, and the like are illustrated as components separate from the AP 1610, but, according to an embodiment, the AP 1610 may include at least a part of the above-mentioned component elements (for example, the cellular module 1621).

According to an embodiment of the present disclosure, the AP 1610 or the cellular module 1621 (for example, the communication processor) may load a command or data received from at least one of a non-volatile memory and other elements connected thereto into a volatile memory and process the loaded command or data. Furthermore, the AP 1610 or the cellular module 1621 may store, in a non-volatile memory, data received from or generated by at least one of the other components.

Each of the Wi-Fi module 1623, the BT module 1625, the GPS module 1627, or the NFC module 1628 may include, for example, a processor for processing data transmitted/received through the corresponding module. Although each of the cellular module 1621, the WiFi module 1623, the BT module 1625, the GPS module 1627, and the NFC module 1628 is illustrated as a separate block in FIG. 16, at least some (for example, two or more) of the cellular module 1621, the WiFi module 1623, the BT module 1625, the GPS module 1627, and the NFC module 1628 may be included in one integrated chip (IC) or IC package according to an embodiment of the present disclosure. For example, at least a few (for example, a communication processor corresponding to the cellular module 1621 and a Wi-Fi processor corresponding to the Wi-Fi module 1623) of the processors corresponding to the cellular module 1621, the Wi-Fi module 1623, the BT module 1625, the GPS module 1627, and the NFC module 1628, respectively, may be implemented by a single SoC.

The RF module 1629 may transmit/receive data, for example, an RF signal. Although not illustrated, the RF module 1629 may include, for example, a transceiver, a Power Amp Module (PAM), a frequency filter, or a Low Noise Amplifier (LNA). Further, the RF unit 1629 may further include a component for transmitting/receiving an electromagnetic wave in the air in radio communication, such as a conductor or a conducting wire. Although FIG. 16 shows that the cellular module 1621, the WiFi module 1623, the BT module 1625, the GPS module 1627, and the NFC module 1628 share one RF module 1629, at least one of the cellular module 1621, the WiFi module 1623, the BT module 1625, the GPS module 1627, and the NFC module 1628 may perform RF signal transmission/reception through a separate RF module.

The SIM card 1624 may be a card including a subscriber identification module and may be inserted into a slot formed in a particular portion of the electronic device. The SIM card 1624 may include unique identification information (for example, Integrated Circuit Card IDentifier (ICCID)) or subscriber information (for example, International Mobile Subscriber Identity (IMSI)).

The memory 1630 (for example, the memory 130) may include an internal memory 1632 or an external memory 1634. The internal memory 1632 may include at least one of a volatile memory (for example, a Dynamic Random Access Memory (DRAM), a Static RAM (SRAM), a Synchronous DRAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like).

According to an embodiment of the present disclosure, the internal memory 1632 may be a Solid State Drive (SSD). The external memory 1634 may further include a flash drive, for example, a Compact Flash (CF), a Secure Digital (SD), a Micro-SD, a Mini-SD, an eXtreme Digital (xD), a memory stick, or the like. The external memory 1634 may be functionally connected to the electronic device 1601 through various interfaces. According to an embodiment of the present disclosure, the electronic device 1601 may further include a storage device (or storage medium) such as a hard drive.

The sensor module 1640 may measure a physical quantity or detect an operating state of the electronic device 1601 and convert the measured or detected information into an electrical signal. The sensor module 1640 may include, for example, at least one of a gesture sensor 1640A, a gyro sensor 1640B, an atmospheric pressure sensor 1640C, a magnetic sensor 1640D, an acceleration sensor 1640E, a grip sensor 1640F, a proximity sensor 1640G, a color sensor 1640H (for example, an RGB sensor), a biometric sensor 1640I, a temperature/humidity sensor 1640J, a illuminance sensor 1640K, and a UV sensor 1640M. Additionally or alternatively, the sensor module 1640 may include, for example, an E-nose sensor (not illustrated), an ElectroMyo- Graphy (EMG) sensor (not illustrated), an ElectroEncephaloGram (EEG) sensor (not illustrated), an ElectroCardioGram (ECG) sensor (not illustrated), an InfraRed (IR) sensor, an iris sensor (not illustrated), or a fingerprint sensor (not illustrated). The sensor module 1640 may further include a control circuit for controlling at least one sensor included therein.

The input device 1650 may include a touch panel 1652, a (digital) pen sensor 1654, a key 1656, or an ultrasonic input device 1658. The touch panel 1652 may recognize a touch input through at least one of, for example, a capacitive type, a resistive type, an infrared type, and an ultrasonic type. The touch panel 1652 may further include a control circuit. The capacitive type touch panel can recognize a physical contact or proximity. The touch panel 1652 may further include a tactile layer. In this case, the touch panel 1652 may provide a tactile reaction to a user.

The (digital) pen sensor 1654 may be implemented, for example, using the same or similar method to receiving a user's touch input or using a separate recognition sheet. The key 1656 may include, for example, a physical button, an optical key or a keypad. The ultrasonic input device 1658 is a device which can detect an acoustic wave by a microphone (for example, a microphone 1688) of the electronic device 1601 through an input tool generating an ultrasonic signal to identify data, and can perform wireless recognition. According to an embodiment of the present disclosure, the electronic device 1601 may also receive a user input from an external device (for example, a computer or a server) connected thereto by using the communication module 1620.

The display 1660 (for example, the display 150) may include a panel 1662, a hologram device 1664, or a projector 1666. The panel 1662 may be, for example, a Liquid Crystal Display (LCD), an Active-Matrix Organic Light Emitting Diode (AM-OLED), or the like. The panel 1662 may be implemented to be, for example, flexible, transparent, or wearable. The panel 1662 may also be configured as one module together with the touch panel 1652. The hologram device 1664 may show a stereoscopic image in the air using interference of light. The projector 1666 may project light onto a screen to display an image. For example, the screen may be located inside or outside the electronic device 1601. According to an embodiment, the display 1660 may further include a control circuit for controlling the panel 1662, the hologram device 1664, or the projector 1666.

The interface 1670 may include, for example, an HDMI 1672, a USB 1674, an optical interface 1676, or a D-subminiature (D-sub) 1678. The interface 1670 may be included in, for example, the communication interface 160 illustrated in FIG. 1. Additionally or alternatively, the interface 1670 may include, for example, a Mobile High-definition Link (MHL) interface, an SD card/Multi-Media Card (MMC) interface, or an Infrared Data Association (IrDA) standard interface.

The audio module 1680 may bilaterally convert a sound and an electrical signal. At least some components of the audio module 1680 may be included in, for example, the input/output interface 140 illustrated in FIG. 1. The audio module 1680 may process voice information input or output through, for example, a speaker 1682, a receiver 1684, earphone 1686, or the microphone 1688.

The camera module 1691 is a device that may take still and moving images, and according to an embodiment of the present disclosure, may include one or more image sensors (for example, a front sensor or a rear sensor), a lens (not shown), an Image Signal Processor (ISP) (not shown), or a flash (for example, an LED or a xenon lamp, not shown).

The power management module 1695 may manage electric power of the electronic device 1601. Although not illustrated, the power management module 1695 may include, for example, a Power Management IC (PMIC), a charger IC, or a battery or fuel gauge.

The PMIC may be mounted, for example, in integrated circuits or SoC semiconductors. The charging methods may be classified into wired charging and wireless charging. The charger IC may charge a battery and prevent inflow of excessive voltage or excessive current from a charger. According to an embodiment of the present disclosure, the charger IC may include a charger IC for at least one of the wired charging and the wireless charging. Examples of the wireless charging may include magnetic resonance charging, magnetic induction charging, and electromagnetic charging, and an additional circuit such as a coil loop, a resonance circuit, and a rectifier may be added for the wireless charging.

The battery gauge may measure, for example, the remaining amount of the battery 1696, a charging voltage and current, or temperature. The battery 1696 may store or generate electricity and supply power to the electronic device 1601 using the stored or generated electricity. The battery 1696 may include, for example, a rechargeable battery or a solar battery.

The indicator 1697 may display a particular state of the electronic device 1601 or a part thereof (for example, the AP 1610), for example, a boot-up state, a message state, a charging state, or the like. The motor 1698 may convert an electrical signal into mechanical vibration. Although not illustrated, the electronic device 1601 may include a processing unit (for example, a GPU) for supporting a mobile TV function. The processing device for supporting mobile TV may process media data according to standards such as, for example, a digital multimedia broadcasting (DMB), a digital video broadcasting (DVB) or a media flow.

Each of the components of the electronic device according to the present disclosure may be implemented by one or more components and the name of the corresponding component may vary depending on the type of the electronic device. The electronic device according to the present disclosure may be configured by including at least one of the above-described elements, and some of the elements may be omitted, or other elements may be added. Further, some of the elements of the electronic device according to the present disclosure may be combined to be one entity, which can perform the same functions as those of the elements before the combination.

The term "module" used in the present disclosure may refer to, for example, a unit including one or more combinations of hardware, software, and firmware. The "module" may be interchangeably used with a term, such as unit, logic, logical block, component, or circuit. The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an Application-Specific IC (ASIC) chip, a Field-Programmable Gate Arrays (FPGA), and a programmable-logic device for performing operations which has been known or are to be developed hereinafter.

According to various embodiments of the present disclosure, at least some of the devices (for example, modules or functions thereof) or the method (for example, operations)

according to the present disclosure may be implemented by a command stored in a non-transitory computer-readable storage medium in a programming module form. When the command is executed by one or more processors, the one or more processors may perform a function corresponding to the command. The non-transitory computer-readable storage medium may be, for example, the memory 260. At least some of the programming modules may be implemented (for example, executed) by, for example, the processor. At least some of the programming modules may include, for example, a module, a program, a routine, a set of instructions or a process for performing one or more functions.

The non-transitory computer readable recording medium may include magnetic media such as a hard disc, a floppy disc, and a magnetic tape, optical media such as a compact disc ROM (CD-ROM) and a DVD, magneto-optical media such as a floptical disk, and hardware devices specifically configured to store and execute program commands, such as a ROM, a RAM, and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The module or programming module according to an embodiment of the present disclosure may include one or more of the above-described elements. Alternatively, some of the above-described elements may be omitted from the programming module. Alternatively, the programming module may further include additional elements. Operations executed by a module, a programming module, or other component elements according to the present disclosure may be executed sequentially, in parallel, repeatedly, or in a heuristic manner. Further, some operations may be executed according to another order or may be omitted, or other operations may be added.

According to various embodiments of the present disclosure, a storage medium having commands stored therein is provided. The commands are configured to allow one or more processor to perform one or more operations when the commands are executed by the one or more processors. The one or more operations may include receiving control information from a second electronic device connected through a wireless communication when a music playing application is executed processing the received control information to be applied to music data requested to be reproduced according to the execution of the music playing application and outputting the processed music data.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device executing a music playing application, the electronic device comprising:
a communication module;
at least one processor configured to:
execute the music playing application,
connect, when the music playing application is executed, with a second electronic device through a wireless communication by using the communication module,
transmit information regarding the music playing application to the second electronic device,
receive control information, corresponding to a motion of the second electronic device, from the second electronic device for the music playing application,
process the received control information to be applied to music data requested to be reproduced, such that a music reproduction time is synchronized with an application time of the received control information, and
generate sound signals based on the music data and the received control information; and
an audio module configured to output the sound signals generated by the processor,
wherein the information regarding the music playing application comprises at least one of information for synchronizing execution of the music playing application of the electronic device to the second electronic device or information for starting an operation of the music playing application, according to the received control information, and
wherein the control information comprises information related to a stroke of at least one guitar string, and the information related to the stroke comprises at least one piece of information selected from an intensity of the stroke, and a generation time of the stroke determined based at least in part on a value measured by at least one sensor of the second electronic device.

2. The electronic device of claim 1, wherein the control information is generated in accordance with motion information of the second electronic device.

3. The electronic device of claim 2, wherein the motion information is determined from a signal detected by the at least one sensor of the second electronic device.

4. The electronic device of claim 3, wherein the at least one sensor of the second electronic device comprises at least one selected from a gesture sensor, a gyro sensor, an atmospheric pressure sensor, a magnetic sensor, an acceleration sensor, a grip sensor, a proximity sensor, a Red Green Blue (RGB) sensor, a biometric sensor, a temperature/humidity sensor, an illumination sensor, or an Ultra Violet (UV) sensor.

5. The electronic device of claim 1, wherein the music playing application comprises a guitar playing application.

6. The electronic device of claim 1, wherein the information related to the stroke further comprises at least one piece of information selected from a direction of the stroke, a speed of the stroke, a pattern of the stroke, or whether the stroke is generated.

7. The electronic device of claim 1, wherein the information related to the stroke is determined according to a change in a value measured by an acceleration sensor or a gyro sensor.

8. The electronic device of claim 1, further comprising a touch pad configured to receive a user input, wherein the at least one processor is further configured to process the user input made through the touch pad to correspond to at least one note of a scale or a chord.

9. The electronic device of claim 1,
further comprising a microphone,
wherein the at least one processor is further configured to process a voice signal input through the microphone to be synthesized with the music data.

10. The electronic device of claim 1,
further comprising at least one sensor,
wherein the at least one processor is further configured to determine a motion of the electronic device based on a value sensed through the at least one sensor and process a preset sound effect to be applied to the music data in accordance with the determined motion.

11. The electronic device of claim 1, wherein the control information includes a signal detected by the at least one sensor of the second electronic device.

12. A method of playing music in an electronic device, the method comprising:
executing a music playing application;
connecting, when the music playing application is executed, with a second electronic device through a wireless communication;
transmitting information regarding the music playing application to the second electronic device;
receiving control information, corresponding to a motion of the second electronic device, from the second electronic device for the music playing application;
processing the received control information to be applied to music data requested to be reproduced, such that a music reproduction time is synchronized with an application time of the received control information;
generating sound signals based on the music data and the received control information; and
outputting the generated sound signals,
wherein the information regarding the music playing application comprises at least one of information for synchronizing execution of the music playing application of the electronic device to the second electronic device or information for starting an operation of the music playing application, according to the received control information, and
wherein the control information comprises information related to a stroke of at least one guitar string, and the information related to the stroke comprises at least one piece of information selected from an intensity of the stroke, and a generation time of the stroke determined based at least in part on a value measured by at least one sensor of the second electronic device.

13. The method of claim 12, wherein the control information is generated in accordance with motion information of the second electronic device.

14. The method of claim 13, wherein the motion information is determined from a signal detected by the at least one sensor of the second electronic device.

15. The method of claim 14, wherein the at least one sensor of the second electronic device comprises at least one selected from a gesture sensor, a gyro sensor, an atmospheric pressure sensor, a magnetic sensor, an acceleration sensor, a grip sensor, a proximity sensor, a Red Green Blue (RGB) sensor, a biometric sensor, a temperature/humidity sensor, an illumination sensor, or an UltraViolet (UV) sensor.

16. The method of claim 12, wherein the music playing application comprises a guitar playing application.

17. The method of claim 12, wherein the information related to the stroke further comprises at least one piece of information selected from a direction of the stroke, a speed of the stroke, a pattern of the stroke, or whether the stroke is generated.

18. The method of claim 12, wherein the information related to the stroke is determined according to a change in a value measured by an acceleration sensor or a gyro sensor.

19. The method of claim 12, further comprising:
receiving a user input through a touch pad; and
processing the user input made through the touch pad to correspond to at least one note of a scale or a chord.

20. The method of claim 12, further comprising processing a voice signal input through a microphone to be synthesized with the music data.

21. The method of claim 12, further comprising:
determining a motion of the electronic device based on a value sensed through at least one sensor; and
processing a preset sound effect to be applied to the music data in accordance with the determined motion.

22. The method of claim 12, wherein the control information includes a signal detected by the at least one sensor of the second electronic device.

23. A non-transitory computer-readable recording medium having a program recorded therein to be executed in a computer, the program comprising executable commands for performing a process to be performed by at least one processor, the process comprising:
executing the music playing application;
connecting, when the music playing application is executed, with a second electronic device through a wireless communication;
transmitting information regarding the music playing application to the second electronic device;
receiving control information, corresponding to a motion of the second electronic device, from the second electronic device for the music playing application;
processing the received control information to be applied to music data requested to be reproduced, such that a music reproduction time is synchronized with an application time of the received control information;
generating sound signals based on the music data and the received control information; and
outputting the generated sound signals,
wherein the information regarding the music playing application comprises at least one of information for synchronizing execution of the music playing application of the electronic device to the second electronic device or information for starting an operation of the music playing application, according to the received control information, and
wherein the control information comprises information related to a stroke of at least one guitar string, and the information related to the stroke comprises at least one piece of information selected from an intensity of the stroke, and a generation time of the stroke determined based at least in part on a value measured by at least one sensor of the second electronic device.

* * * * *